United States Patent
Greenberg et al.

(10) Patent No.: US 11,392,777 B2
(45) Date of Patent: Jul. 19, 2022

(54) VOICE-BASED INTERFACE FOR TRANSLATING UTTERANCES BETWEEN USERS

(71) Applicant: Google LLC, Mountain View, CA (US)

(72) Inventors: Michael Greenberg, Mountain View, CA (US); Bertrand Damiba, Mountain View, CA (US); Olivia Grace, Mountain View, CA (US); Fei Wu, Mountain View, CA (US); Shane Brennan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 639 days.

(21) Appl. No.: 16/324,610

(22) PCT Filed: Feb. 6, 2019

(86) PCT No.: PCT/US2019/016867
§ 371 (c)(1),
(2) Date: Feb. 11, 2019

(87) PCT Pub. No.: WO2020/122972
PCT Pub. Date: Jun. 18, 2020

(65) Prior Publication Data
US 2021/0334478 A1 Oct. 28, 2021

Related U.S. Application Data

(60) Provisional application No. 62/779,927, filed on Dec. 14, 2018.

(51) Int. Cl.
*G06F 40/58* (2020.01)
*G10L 15/22* (2006.01)
(Continued)

(52) U.S. Cl.
CPC .............. *G06F 40/58* (2020.01); *G06F 40/51* (2020.01); *G10L 15/005* (2013.01); *G10L 15/22* (2013.01)

(58) Field of Classification Search
CPC ........... G06F 40/45; G06F 40/44; G06F 40/58
See application file for complete search history.

(56) References Cited

U.S. PATENT DOCUMENTS

2002/0116173 A1* 8/2002 Ratnaparkhi ........... G06F 40/56
704/9
2007/0033053 A1* 2/2007 Kronenberg .......... H04M 3/493
704/275

(Continued)

FOREIGN PATENT DOCUMENTS

GB          2 518 318 A      3/2015
WO    WO-2017/112813 A1    6/2017

OTHER PUBLICATIONS

International Search Report and Written Opinion of the International Searching Authority for Appl. Ser. No. PCT/US2019/016867 dated Jul. 12, 2019 (16 pages).

(Continued)

*Primary Examiner* — Jialong He
(74) *Attorney, Agent, or Firm* — Middleton Reutlinger (57) ABSTRACT

The systems and methods described herein can generate a voice-based interface to increase the accuracy of translations. The voice-based interface can result in fewer input audio signals being transmitted between devices of a network. Reducing the number of redundant translation requests that are sent between the devices of a network can save bandwidth and other computational resources by processing fewer input audio signals.

19 Claims, 4 Drawing Sheets

(51) Int. Cl.
*G06F 40/51* (2020.01)
*G10L 15/00* (2013.01)

(56) References Cited

U.S. PATENT DOCUMENTS

| | | | |
|---|---|---|---|
| 2008/0077390 A1* | 3/2008 | Nagao | G10L 15/28 704/7 |
| 2008/0133245 A1* | 6/2008 | Proulx | G06F 40/55 704/277 |
| 2009/0281789 A1* | 11/2009 | Waibel | G06F 40/40 704/3 |
| 2010/0121629 A1* | 5/2010 | Cohen | G10L 13/00 704/2 |
| 2012/0035907 A1* | 2/2012 | Lebeau | G10L 13/00 704/235 |
| 2012/0101821 A1* | 4/2012 | Tsuda | G10L 15/22 704/243 |
| 2013/0238312 A1 | 9/2013 | Waibel | |
| 2014/0188455 A1* | 7/2014 | Manuselis | H04R 1/406 704/3 |
| 2014/0337007 A1 | 11/2014 | Waibel et al. | |
| 2014/0365200 A1* | 12/2014 | Sagie | G06F 40/51 704/2 |
| 2015/0134322 A1* | 5/2015 | Cuthbert | G06F 40/58 704/3 |
| 2015/0154183 A1 | 6/2015 | Kristjansson et al. | |
| 2015/0347399 A1* | 12/2015 | Aue | H04M 11/10 704/2 |
| 2016/0147744 A1* | 5/2016 | Wang | G06F 40/51 704/277 |
| 2016/0364385 A1* | 12/2016 | Waibel | G06F 40/58 |
| 2017/0060850 A1 | 3/2017 | Lewis et al. | |
| 2017/0148436 A1* | 5/2017 | Sugiura | G10L 15/14 |
| 2018/0089176 A1* | 3/2018 | Kim | G06F 40/58 |

OTHER PUBLICATIONS

European Patent Office; Communication issued in Application No. 21167063.3; 11 pages; dated Jun. 4, 2021.
European Patent Office; Intention to Grant for European Application No. 19706186; 49 pages; dated Oct. 8, 2020.
Intellectual Property India; Examination Report issued in Application No. 202027054382; 6 pages; dated Aug. 16, 2021.

* cited by examiner

FIG. 3

VOICE-BASED INTERFACE FOR TRANSLATING UTTERANCES BETWEEN USERS

CROSS-REFERENCE TO RELATED APPLICATIONS

This application is a U.S. National Stage under 35 U.S.C. § 371 of International Patent Application No. PCT/US19/16867, filed on Feb. 6, 2019 and designating the United States, which application claims priority under 35 U.S.C. § 119 to U.S. Provisional Patent Application No. 62/779,927, filed Dec. 14, 2018, each of which is herein incorporated by reference in its entirety.

BACKGROUND OF THE DISCLOSURE

Networked devices can process audio-based signals. The devices' ability to process the audio-based signals can be based on the quality of the audio-based signals or the devices' ability to understand the audio-based signals. Audio-based signals can have relatively large file sizes. Excessive network transmissions, packet-based or otherwise, of network traffic data between computing devices based on poor audio quality can prevent a computing device from properly processing the audio-based signals.

SUMMARY OF THE DISCLOSURE

According to at least one aspect of the disclosure, a system to generate a voice-based interface can include a data processing system. The data processing system can include a memory and one or more processors that execute a natural language processor component, a translation engine, and a signal generator component. The data processing system can receive, at an interface of the data processing system, a first input audio signal detected by a sensor of a client device. The data processing system can generate, by a natural language processor component, a first input string based on the first input audio signal. The data processing system can determine, by the natural language processor component, a first confidence score indicating the accuracy of the first input string. The data processing system can generate, by a translation engine, a first translation string and a second translation string from the first input string and based on the first confidence score being above a predetermined threshold. The data processing system can determine, by the translation engine, a first translation score for the first translation string indicating an accuracy of the first translation string and a second translation score for the second translation string indicating an accuracy of the second translation string. The data processing system can select, by the translation engine, the first translation string based on the first translation score and the second translation score. The data processing system can generate, by the signal generator component, an output audio signal from the first translation string. The data processing system can transmit, by the interface, the output audio signal to the client device to render the output audio signal.

According to at least one aspect of the disclosure, a method to generate a voice-based interface can include receiving, at an interface of the data processing system, a first input audio signal detected by a sensor of a client device. The method can include generating, by a natural language processor component, a first input string based on the first input audio signal. The method can include determining, by the natural language processor component, a first confidence score indicating the accuracy of the first input string. The method can include generating, by a translation engine, a first translation string and a second translation string from the first input string and based on the first confidence score being above a predetermined threshold. The method can include determining, by the translation engine, a first translation score for the first translation string indicating an accuracy of the first translation string and a second translation score for the second translation string indicating an accuracy of the second translation string. The method can include selecting, by the translation engine, the first translation string based on the first translation score and the second translation score. The method can include generating, by the signal generator component, an output audio signal from the first translation string. The method can include transmitting, by the interface, the output audio signal to the client device to render the output audio signal.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The details of one or more implementations are set forth in the accompanying drawings and the description below. Other features, aspects, and advantages of the disclosure will become apparent from the description, the drawings, and the claims, in which:

The systems and methods described herein can translate utterances between a plurality of users. The system can receive input audio signals that contain a user's utterances and generate output signals that include a translation of the user's utterances. The system can operate as a remote agent (e.g., a client device) that, when invoked by the user, captures the user's utterances and transmits the utterances in an input audio signal to a data processing system. The data processing system allows two or more language models to be run in parallel (e.g., one language model for each user speaking in the conversation). Running the language models in parallel can enable either user to speak at any given time. This enables the system to not enforce conversational turns between the users. Rather, one user can speak multiple utterances one after another and the system can automatically determine a translation of the utterances without requiring additional input indicating which user is speaking for particular utterances. The system therefore addresses problems associated with how data is processed within a translation system.

The systems and methods described herein can increase the accuracy of the translation, which can result in fewer input audio signals being sent to the data processing system. For example, as the system can reduce the number of redundant translation requests that are sent to the data processing system, the system can save bandwidth and other computational resources by processing fewer input audio signals.

The system and methods described herein can increase the accuracy of the translation by incorporating confidence scores at a plurality of points in the translation pathway. The system can incorporate a first confidence score into the translation pathway after receiving the input audio signal. For example, when the data processing system receives an input audio signal containing user utterances, the data processing system can run a speech recognition algorithm on the input audio signal to identify the utterances and convert the utterances to a text string. The system can calculate a confidence score of the text string that indicates a predicted accuracy in the system's conversion of the utterance to a text string. A low confidence score can indicate that the data processing system believes the data processing system did not understand or properly convert the utterance to a text string. When the confidence score is low, the data processing system can send an output signal to the client device requesting a clarification of the utterance. For example, the data processing system can request that the utterance be repeated, or the data processing system can include the text string in an output signal that is rendered to the user. The user can confirm or deny whether the utterance was properly converted to a text string.

The systems and methods can also include confidence scores to indicate how well an input utterance can be translated into the target language. For example, if the utterance includes a figure of speech or phrase that may not translate well into the target language, the system can assign the utterance a low translation confidence score. Based on the low translation confidence score, the system can ask the user providing the utterance to rephrase the utterance.

Figure 1:
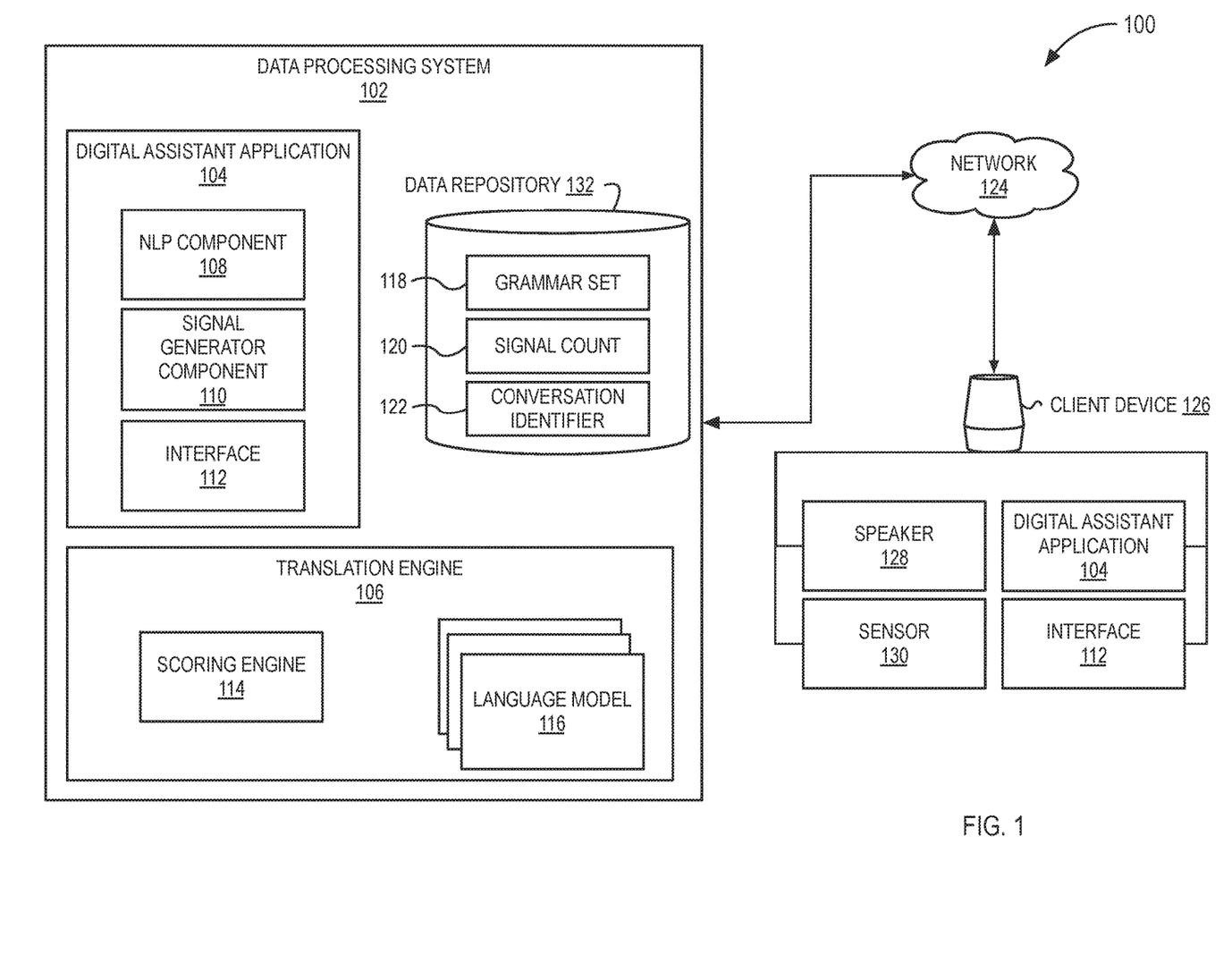
FIG. 1 illustrates a block diagram of an example system to generate a voice-based interface.

FIG. 1 illustrates a block diagram of an example system 100 to generate a voice-based interface. The system 100 can include one or more data processing systems 102 that can communicate with one or more client devices 126 via a network 124.

The system 100 can include one or more networks 124. The network 124 can include any type and form of network, including local area networks (LANs), wide area networks (WANs) such as the Internet, satellite networks, cable networks, broadband networks, fiber optic networks, microwave networks, cellular networks, wireless networks, or any combination of these or other such networks. The network 124 can include one or more different types of networks. The network 124 can include a plurality of additional devices, including gateways, modems, firewalls, routers, switches, etc. The network 124 can also include any number of computing devices (e.g., computers, servers, routers, network switches, etc.) that are configured to receive and/or transmit data within the network 124. The network 124 can include any number of hardwired and/or wireless connections. For example, a client device 126 can communicate wirelessly (e.g., via Wi-Fi, cellular, radio, etc.) with a transceiver that is hardwired (e.g., via a fiber optic cable, a CAT5 cable, etc.) to other computing devices in the network 124. The network 124 can be a virtual network, such as a virtual network between a plurality of virtual machines executed by a single physical machine, or an abstract network such as an offline transfer of data via physically movable media (e.g., transferring data via tape media, CD-ROM, flash media, external hard drives, floppy disks, etc.).

The network 124 can be used to access information resources such as webpages, websites, domains, or uniform resource locators that can be presented, output, rendered, or displayed on at least one client device 126, such as a laptop, desktop, tablet, digital assistant, personal digital assistant, smartwatch, wearable device, smart phone, portable computer, or speaker. For example, via the network 124 a user of the client device 126 can access information, data, or services provided by the data processing system 102.

The network 124 can include a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network, and a wireline network. The network 124 may include a wireless link, such as an infrared channel or satellite band. The topology of the network 124 may include a bus, star, or ring network topology. The network may include mobile telephone networks using any protocol or protocols used to communicate among mobile devices, including advanced mobile phone protocol ("AMPS"), time-division multiple access ("TDMA"), code-division multiple access ("CDMA"), global system for mobile communication ("GSM"), general packet radio services ("GPRS"), or universal mobile telecommunications system ("UMTS"). Different types of data may be transmitted via different protocols, or the same types of data may be transmitted via different protocols.

The system 100 can include at least one data processing system 102. The data processing system 102 can include at least one logic device, such as a computing device having a processor to perform the methods described herein. The data processing system 102 can communicate via the network 124, for example, with the client device 126. The data processing system 102 can include at least one computation resource, server, processor, or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm, or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The data processing system 102 can include a digital assistant application 104. The digital assistant application 104 can be an application, applet, script, service, daemon, routine, or other executable logic that is executed by one or more processors of the data processing system 102 to generate voice-based interfaces. The digital assistant application 104 can detect one or more terms within a spoken, typed, or other form of text and translate the terms from an input language to a target language.

The digital assistant application 104 can include one or more natural language processor (NLP) components 108, one or more signal generator components 110, and one or more interfaces 112. The digital assistant application 104 can use the NLP component 108 to understand utterances in an input audio signal and to convert the utterance to a text string. The digital assistant application 104 can generate output signals that are provided to the client device 126 with the signal generator component 110. The digital assistant application 104 can send and receive data with the client device 126 via the interface 110.

The NLP component 108 can receive or obtain data packets that can include input audio signals detected at the client device 126. The data packets can provide a digital file. The NLP component 108 can parse the input audio signal. For example, the NLP component 108 can provide for interactions between a human and a computer. The NLP component 108 can be configured with techniques for understanding natural language and enabling the data processing system 102 to derive meaning from human or natural language input. The NLP component 108 can convert the input audio signal into a text string that includes the terms uttered in the input audio signal. The NLP component 108 can convert the text string between languages using the translation engine 106.

The NLP component 108 can include or be configured with techniques based on machine learning, such as statistical machine learning. The NLP component 108 can utilize decision trees, statistical models, or probabilistic models to parse the input audio signal. The NLP component 108 can perform, for example, functions such as named entity recognition (e.g., given a stream of text, determine which items in the text map to proper names, such as people or places, and what the type of each such name is, such as person, location, or organization), natural language generation (e.g., converting information from computer databases or semantic intents into understandable human language), natural language understanding (e.g., converting text into more formal representations such as first-order logic structures that a computer module can manipulate), machine translation (e.g., automatically translating text from one human language into another), morphological segmentation (e.g., separating words into individual morphemes and identifying the class of the morphemes, which can be challenging based on the complexity of the morphology or structure of the words of the language being considered), question answering (e.g., determining an answer to a human-language question, which can be specific or open-ended), and semantic processing (e.g., processing that can occur after identifying a word and encoding its meaning in order to relate the identified word to other words with similar meanings).

The NLP component 108 can convert the input audio signal into recognized text by comparing the input signal against a stored, representative set of audio waveforms and choosing the closest matches. The NLP component 108 can process the input audio signal using a grammar set 118 associated with the language of the input audio signal. The set of audio waveforms can be stored in data repository 124 or other database accessible to the data processing system 102. The representative waveforms are generated across a large set of users and then may be augmented with speech samples from the user. After the audio signal is converted into recognized text, the NLP component 108 matches the text to words that are associated, for example, via training across users or through manual specification, with actions that the data processing system 102 can serve. The NLP component 108 can convert image or video input into text or digital files. The NLP component 108 can process, analyze, or interpret image or video input to perform actions, generate requests, or select or identify data structures. As described herein, the NLP component 108 and the translation engine 106 can identify the language of the utterance in the input audio signal or the recognized text to convert the utterance or text from a first, input language to a second, output language.

The digital assistant application 104 can include one or more signal generator components 110. The signal generator component 110 can be an application, applet, script, service, daemon, routine, or other executable logic to generate output audio-based signals. The signal generator component 110 can generate an output signal that can include computer-generated speech output. The signal generator component 110 can provide the computer-generated speech output to the client device 126 in a plurality of data packets or a file. The client device 126 can render or otherwise output the computer-generated speech output to the user via one or more speakers 128. The signal generator component 110 can convert textual data (e.g., a text string including a translation of an utterance) into computer-generated speech for output at the client device 126.

The signal generator component 110 can generate an output signal configured to be rendered in a plurality of mediums or in mediums other than an audio-based medium. For example, the output signal may not include computer-generated speech output, and the translation string can be rendered as text on a screen of the client device 126. The signal generator component 110 can generate intermediate output signals. The intermediate output signals can include requests, instructions, or other information. For example, when a request is made to the data processing system 102 for a translation, the signal generator component 110 can generate an intermediate output signal including instructions to the user for interacting with the digital assistant application 104 before providing the requested translation in an output signal.

The signal generator component 110 can configure the intermediate output signals based on signal counts and conversation counts. Signal counts can indicate the number of utterances or input audio signals included in the current conversation. Conversation counts can indicate the number of conversations a user has requested be translated by the data processing system 102. As the conversation count or signal count increases, the signal generator component 110 can generate shorter or less verbose intermediate output signals as the user becomes accustomed to interacting with the digital assistant application 104.

The data processing system 102 can include one or more interfaces 112. The interface 112 can be configured, constructed, or operational to receive and transmit information using, for example, data packets. The interface 112 can receive and transmit information using one or more protocols, such as a network protocol. The interface 112 can include a hardware interface, software interface, wired interface, or wireless interface. The interface 112 can facilitate translating or formatting data from one format to another format. For example, the interface 112 can include an application programming interface that includes definitions for communicating between various components, such as software components.

The interface 112 can be a hardware-based interface. For example, the interface 112 can be a network interface or an input/output (I/O) interface. The network interface can include any type and form of interface, including Ethernet, including 10BASE-T, 100BASE-T, or 1000BASE-T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 124. The data processing system 102 can include a plurality of network interfaces of different types, allowing for connections to a variety of networks, such as the Internet via different sub-networks.

The I/O interfaces can be any electronic device that can convey data to a user by generating sensory information (e.g., a visualization on a display, one or more sounds, tactile feedback, etc.). The I/O interfaces can convert received sensory information from a user into electronic signals (e.g., a keyboard, a mouse, a pointing device, a touch screen display, a microphone, etc.). The interface 112 can be a graphical interface that enables a user to interact or otherwise provide or receive data from the data processing system 102.

The data processing system 102 can include or otherwise have access to one or more translation engines 106. For example, the translation engine 106 can be provided by a second data processing system that the data processing system 102 is in communication with via the network 124. The translation engine 106 can be an application, applet, script, service, daemon, routine, or other executable logic to translate content (e.g., text) from a first, input language and into a second, target language.

The translation engine 106 can utilize one or more language models 116 to determine the text or other semantic representations of a spoken utterance that are in the input audio signal (or text string thereof). The translation engine 106 can include different language models 116 for different languages. Each of the language models 116 can correspond to a different language. For example, a first language model 116 can correspond to English, and a second language model 116 can correspond to French. The translation engine 106 can use the language models 116 to translate the utterances (or text thereof) from an input language to a target (or output) language. Each of the language models 116 can include an input language and an output language.

Each of the language models 116 can include machine learning models (e.g., neural network models) or statistical models for determining text (or other semantic representation) that corresponds to a spoken utterance within the input audio signal. The translation engine 106 can use the language models 116 to identify phonemes in the spoken utterance of the input audio signal and output text in the language corresponding to the language model 116.

The translation engine 106 can pass an input audio signal or text string to a plurality of language models 116 in parallel. For example, when the data processing system 102 receives an input audio signal, the translation engine 106 can pass the input audio signal to both a first and second language model 116. The translation engine 106 can generate a candidate interpretation (e.g., a candidate text string) of utterances contained in the input audio signal based on each of the language models 116 that processes the input audio signal. The translation engine 106 can determine which of the candidate interpretations to use based on a score generated by the scoring engine 114. For example, based on a translation confidence score, the translation engine 106 can determine whether a text string should be translated from English to French or from French to English.

The translation engine 106 can include one or more scoring engines 114. The scoring engine 114 can be an application, applet, script, service, daemon, routine, or other executable logic to calculate a score indicating a level of confidence in the accuracy in the processing of the input audio signal. The scoring engine 114 can determine different types of scores. The scoring engine 114 can determine at least a confidence score in the conversion of the utterance to a text string and a confidence score in how well the utterance can be translated into the target language. The scoring engine 114 can determine confidence scores and translations scores for each of the input audio signals.

The scoring engine 114 can calculate a confidence score for each input audio signal. The confidence score can indicate a level of confidence in the accuracy of the text string generated based on the utterance contained within the input audio signal. The scoring engine 114 can calculate a translation confidence score for each input audio signal. The translation score can indicate an accuracy of a translation of the text string from a first language into a second, target language. For example, utterances that include figures of speech that do not translate well from a first language into a second language can be given a low translation confidence score.

The data processing system 102 can include one or more data repositories 132. The data repository 132 can include one or more local or distributed databases. The data repository 132 can include memory in which machine instructions can be stored. When the machine instructions are executed by a processor of the data processing system 102, the instructions can cause the data processing system 102 to perform the operations described herein. The processor 200 can include a microprocessor, ASIC, FPGA, or other control logic. The processor can be a multi-core processor or an array of processors. The memory can include, but is not limited to, electronic, optical, magnetic, or any other storage devices capable of providing the processor with program instructions. The memory can include a floppy disk, CD-ROM, DVD, magnetic disk, memory chip, ROM, RAM, EEPROM, EPROM, flash memory, optical media, or any other suitable memory from which the processor 200 can read instructions. The instructions can include code from any suitable computer programming language such as, but not limited to, C, C++, C#, Java, JavaScript, Perl, HTML, XML, Python, and Visual Basic.

The data processing system 102 can store one or more grammar sets 118, signal counts 120, and conversation counts 122 in the data repository 132. The grammar sets 118 can be data structures that contains the rules that describe the structure of a language. The data repository 132 can include a different grammar set 118 for each of the language models 116. The data repository 132 can include context-specific grammar sets 118. The data repository 132 can include grammar sets 118 that the language model 116 or NLP component 108 can use when processing or generating utterances within a predetermined domain. For example, when the utterance includes a plurality of medical terms the NLP component 108 can select a medical-specific grammar set 118.

The data repository 132 can include one or more data structures storing signal count 120. When the data processing system 102 receives an input audio signal, the digital assistant application 104 can store the text string in a data structure within the data repository 132. The input audio signal can be a turn in a conversation. For each conversation, the data processing system 102 can generate a conversation identifier 122. The data processing system 102 can store the text string in the data repository 132 in association with the conversation identifier 122. With each text string, the data processing system 102 can also store a signal count or turn identifier. The signal count 120 can indicate the text string's sequential location in a conversation. During a conversation, the data processing system 102 can track or determine the number of input audio signals received as part of a conversation and store the count as a signal count 120. The data processing system 102 can identify the unique number of conversation identifiers 122 in the data repository 132 and can determine a number of conversations the data processing system 102 has processed for a given client device 126. The signal generator component 110 can generate output signals based on the signal count 120. The signal generator component 110 can generate output signals based on the number of conversations the data processing system 102 has processed for a given client device 126. For example, for a first conversation, the signal generator component 110 can generate output signals that include relatively long and descriptive instructions. The signal generator component 110 can attenuate the instructions as the number of conversations increases and the user becomes familiar with interacting with the client device 126.

The data processing system 102 can reset the signal count 120 and the conversation identifier 122 at predetermined intervals. For example, the data processing system 102 can reset the signal count 120 and the conversation identifier 122 based on time-based rules (e.g., every week, month, or year) or event-based rules (e.g., after the conclusion of a conversation or after a new user is associated with the client device 126). The time-based rules can be based on a length of inactivity. For example, the data processing system 102 can reset the conversation identifiers 122 after a predetermined length of inactivity such that instructions can be provided to the user after the inactive time.

The system 100 can include one or more client devices 126. The client device 126 can, for example, provide translation services for one or more users of the client device 126. The client device 126 may or may not include a display. For example, the client device 126 may include limited types of user interfaces, such as a microphone and speaker (e.g., the client device 126 can include a voice-drive or audio-based interface). The primary user interface of the client device 126 can include a sensor 130 (e.g., a microphone) and the speaker 128.

The client device 126 can include or otherwise interface with one or more sensors 130. The sensors 130 can include, for example, a camera, ambient light sensor, proximity sensor, temperature sensor, accelerometer, gyroscope, motion detector, GPS sensor, location sensor, microphone, video sensor, image detection sensor, touch sensor, or any combination thereof. The sensor 130 can be a microphone to detect utterances generated by the user of the client device 126. The digital assistant application 104 can convert the utterance into an input audio signal that is transmitted from the client device 126 to the data processing system 102. The client device 126 can include one or more speakers 128. The client device 126 can render output signals from the data processing system 102 to the user via the speaker 128.

The client device 126 can include an instance of the digital assistant application 104. The digital assistant application 104 can be executed by one or more processors of the client device 126. The digital assistant application 104 executed at the client device 126 can be an instance of the digital assistant application 104 executed at the data processing system 102. The client device's digital assistant application 104 can perform any of the functions of the described in relation to the data processing system's digital assistant application 104. The digital assistant application 104 can be activated from within another application. For example, the user can activate the digital assistant application 104 within a video conference application to provide translation services to the video conference application.

The digital assistant application 104 can convert the analog audio signals detected by the speaker 128 into a digital input audio signal and transmit one or more data packets carrying the input audio signal to the data processing system 102. The digital assistant application 104 can perform pre-filtering or pre-processing on the input audio signal. The digital assistant application 104 can pre-filter or pre-process the input audio signal to remove certain frequencies of audio, noise, or other components of the input audio signal. The pre-filtering can include filters such as a low-pass filter, high-pass filter, or a bandpass filter. The filters can be applied in the frequency domain. The filters can be applied using digital signal processing techniques. The filter can be configured to keep frequencies that correspond to a human voice or human speech while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The digital assistant application 104 can apply the bandpass filter prior to transmitting the input audio signal to the data processing system 102, thereby reducing network bandwidth utilization.

The digital assistant application 104 can apply additional pre-processing or pre-filtering techniques such as noise reduction techniques to reduce ambient noise levels that can interfere with natural language processor. Noise reduction techniques can improve accuracy and speed of natural language processor, thereby improving the performance of the data processing system 102.

The client device 126 can include one or more interfaces 112. The interfaces 112 can be a data interface, hardware interface, software interface, graphical interface, or network interface that enable the components of client device 126 to communicate with other components of the system 100. The interface 104 can provide or transmit one or more data packets that include input audio signal and output signals between the client device 126 and the data processing system 102.

Figure 2:
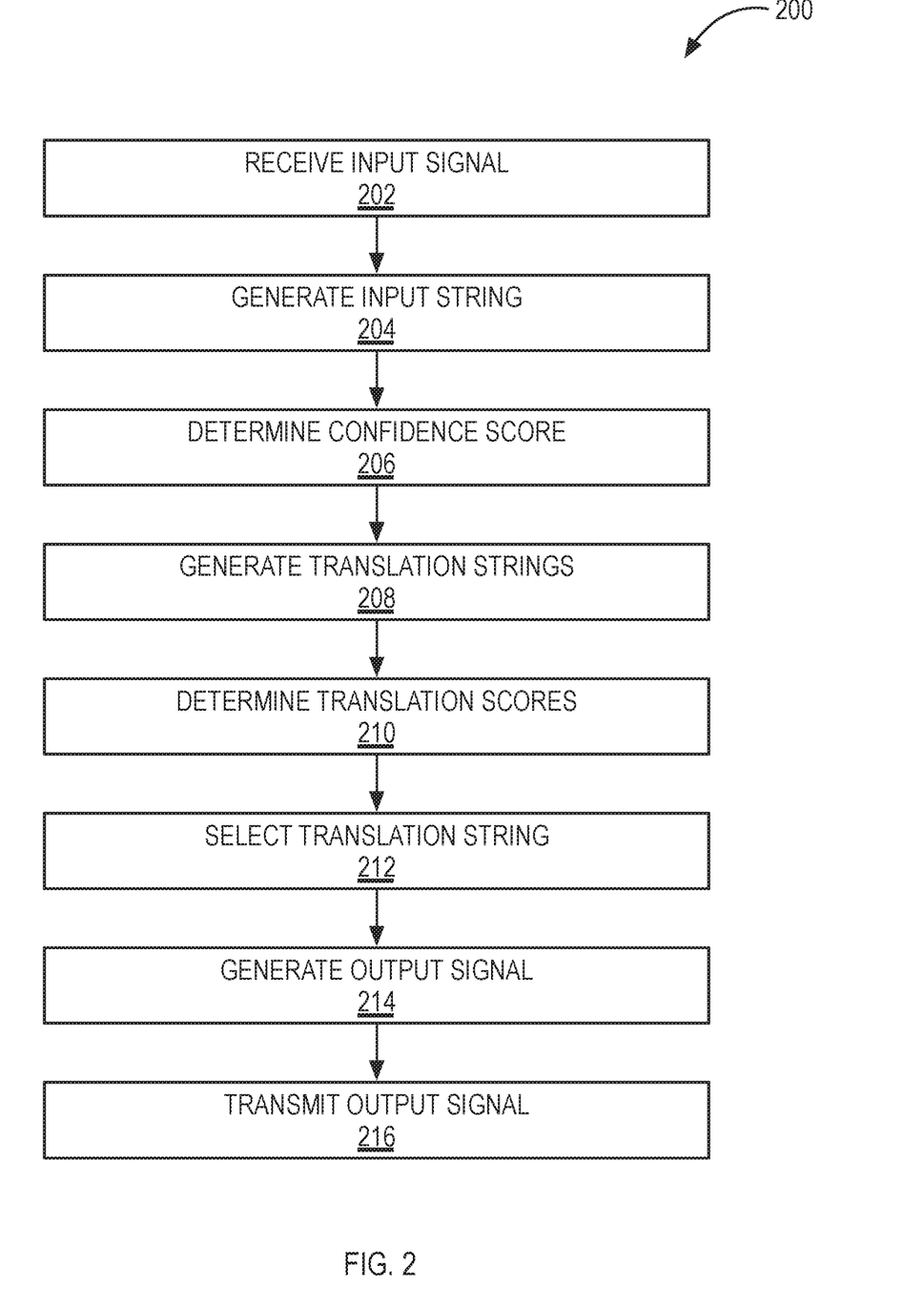
FIG. 2 illustrates a block diagram of an example method to generate a voice-based interface using the system illustrated in FIG. 1.

FIG. 2 illustrates a block diagram of an example method to generate a voice-based interface using the system illustrated in FIG. 1. The method 200 can include receiving an input signal (ACT 202). The method 200 can include generating an input string (ACT 204). The method 200 can include determining one or more confidence scores (ACT 206). The method 200 can include generating one or more translation strings (ACT 208). The method 200 can include determining one or more translation scores (ACT 210). The method 200 can include selecting a translation string (ACT 212). The method 200 can include generating an output signal (ACT 214). The method 200 can include transmitting the output signal (ACT 216).

The method 200 can include receiving an input signal (ACT 202). Also referring to FIG. 1, among others, the method 200 can include receiving a first input audio signal. The data processing system 102 can receive the first input audio signal at the interface 112. The client device 126 can detect, with a sensor 130, an utterance generated by a user. The client device 126 can digitize the utterance into an input audio signal and transmit the input audio signal to the data processing system 102. The client device 126 can transmit the input audio signal to the data processing system 102 via the network 124 as a plurality of digitized packets. The first input audio signal can be the first utterance in a voice-based, conversational interaction with the client device 126. The first input audio signal can include a request to provide translation services.

Figure 3:
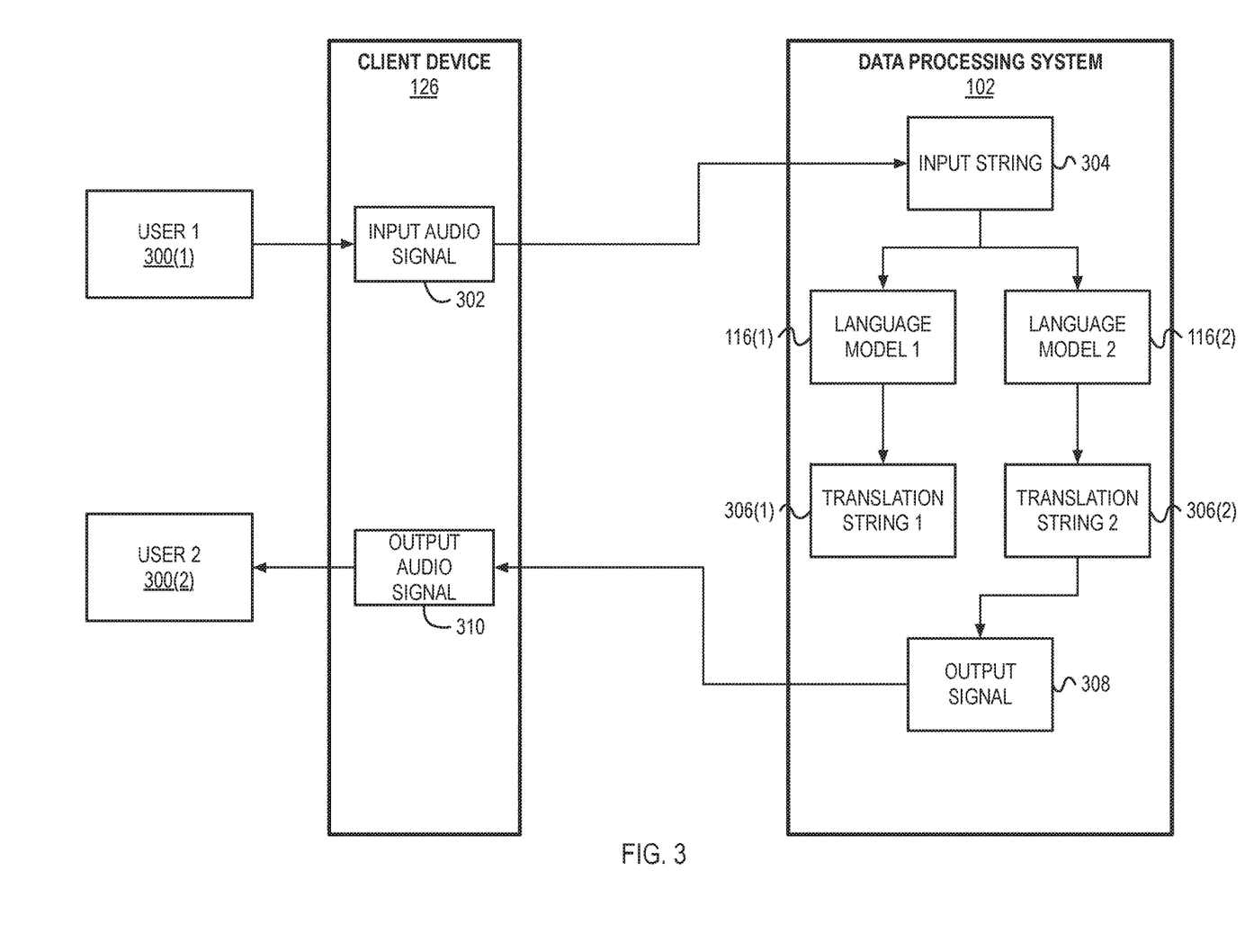
FIG. 3 illustrates a flow diagram of generating a voice-based interface using the system illustrated in FIG. 1.

For example, and also referring to FIG. 3, which illustrates a flow diagram of generating a voice-based interface, a first user 300(1) can speak an utterance to the client device 126. The client device 126 can ignore utterances unless the utterance begins with an activation or wake word of the client device 126, such as "okay." The client device 126 can digitize the utterance from the user 300(1) and generate the input audio signal 302. The user of the client device 126 can also set the client device 126 into an ambient translation mode such that the client device 126 can convert utterances to input audio signals without the user specifically having to invoke or activate the client device 126. The client device can convert utterances to input audio signals until the user ends the ambient translation mode.

The method 200 can include generating an input string (ACT 204). The NLP component 108 of the data processing system 102 can receive the first input audio signal. The NLP component 108 can convert the speech within the first input audio signal into an input string of text. As illustrated in FIG. 3, the data processing system 102 can convert the input audio signal 302 into an input string 304.

The method 200 can include determining a confidence score (ACT 206). The NLP component 108 and the scoring engine 114 can determine a confidence score that indicates the accuracy of a first input string. For example, the confidence score can indicate a confidence level that the NLP component's speech recognition system accurately understood the speech within the input audio signal. The confidence score can be a score between 0% and 100% confident. The confidence score can be a relative ranking, such as an indication of high confidence, medium confidence, or low confidence.

For example, if an input audio signal included the utterance "do you have time for lunch today" and the data processing system's speech recognition system converted the input audio signal into the input string "dew yah have time fr launch tooth bae," the scoring engine 114 can assign a low confidence score to the input string.

The signal generator component 110 of the data processing system 102 can generate intermediate output signals. The intermediate output signals can be output signals generated between the conversational turns of the users. The data processing system 102 can transmit the intermediate signals to the client device 126, which can render the output signals to the users via the speaker 128. The intermediate output signals can include a request for additional information, verbal instructions, or a confirmation.

The signal generator component 110 can generate intermediate output signals based on the confidence score generated at ACT 206. For example, if the confidence score is low (or below a predetermined threshold), the signal generator component 110 can generate an intermediate output signal that indicates to the user that the utterance in the first input audio signal was not properly heard and requests an updated input audio signal (e.g., a request to repeat the utterance contained within the first input audio signal). If the confidence score is below the predetermined threshold, the data processing system 102 can discard the input string. The data processing system 102 can discard the input string and wait for an additional input audio signal, which the data processing system can receive in response to the intermediate output signal. For example, the data processing system 102 can determine that a first input string has a confidence score below the predetermined threshold. The data processing system 102 can generate an intermediate output signal that includes a request for the user to repeat or rephrase the utterance in the first input string. The data processing system 102 can then discard the first input string and process the input audio signal transmitted to the data processing system 102 in response to the intermediate output signal.

If the confidence score is a medium confidence score, the signal generator component 110 can generate an intermediate output signal that includes the input string. For example, the intermediate output signal including the input string can be transmitted to the client device 126 and rendered to the user to confirm that the utterance in the first input audio signal was properly converted to text. If the confidence score is high or above a predetermined threshold, the data processing system 102 can proceed to generate one or more translation strings without generating an intermediate output signal.

The method 200 can include generating one or more translation strings (ACT 208). For example, and also referring to FIG. 3, the translation engine 106 can pass the input string 304 through a first language model 116(1) to generate a first translation string 306(1) and through a second language model 116(2) to generate a second translation string 306(2).

The translation engine 106 can process input strings 304 with multiple language models 116 (e.g., language model 116(1) and language model 116(2)). The translation engine 106 can simultaneously process input string 304 with the first language model 116(1) and the second language model 116(2). The translation engine 106 can process the input string 304 with both of the language models 116 to enable the users 300 to speak out of turn. For example, rather than enforcing a turn-based conversation.

The language models 116 can be language models for translating between languages. The translation engine 106 can use one of the language models 116 to translate from a first language to a second language and a second language model 116 to translate from the second language to the first language. For example, the language model 116(2) can translate from the language of the user 300(1) to the language of the user 300(2), and the language model 116(1) can translate from the language of the user 300(2) to the language of the user 300(1).

The translation engine 106 can automatically select which language models 116 to use, or a user can specify which language models 116 to use. For example, in the input audio signal the user 300(1) may say "okay, translate between English and French." The NLP component 108 can identify the words "English" and "French" in the input audio signal and can instruct the translation engine 106 to select a language model 116 for translation between English and French and a language model 116 for translation between French and English.

The translation engine 106 can automatically select the language models 116 by automatically identifying the language of the user 300(1) and the user 300(2). For example, the data processing system 102 can associate a language with each of the users 300 by identifying the fundamental frequency of the user's voice to identify a user 300 and then select a language model 116 based on the user's preferred language.

The translation engine 106 can parse the input string 304 and send parsed portions of the input string 304 to each of the language models 116. For example, the translation engine 106 can parse the input string 304 to break the input string 304 into a plurality of input strings at each break (e.g., a comma, period, or semicolon) in the original input string 304. The translation engine 106 can provide each of the plurality of input strings to the language models 116 to detect instances where a single user may switch between speaking in two different languages.

Referring to FIG. 2, the method 200 can include determining translation scores (ACT 210). The translation engine 106 can determine a translation score for each of the translation strings 306. The translation scores can indicate a likelihood that the first input audio signal included an utterance in the language associated with the input language of each of the respective language models 116. For example, if the input string was in English, the translation string generating by passing the input string through an English-to-French language model can have a relatively high translation score when compared to the translation score of the translation string generated by passing the input string through a French-to-English language model.

The scoring engine 114 can determine the translation score by comparing or processing the translation string with an output grammar set. For example, the scoring engine 114 can determine the target, output language by determining which grammar set most conforms to the structure of the translation strings.

The translation engine 106 can also determine a translation score that indicates the accuracy of the translation of the input string to the translation string. The translation score of the accuracy of the translation can also be referred to as a translation confidence score. The translation confidence score can indicate how well one or more phrases in the input string translate into the language of the target language. For example, an input string that includes an idiom or figure of speech may be translated literally, and the translation may not convey the intended meaning of the original speaker. The translation engine 106 can assign a low translation confidence score to a translation string generated from the input string.

When the translation engine 106 assigns a low translation confidence score to the translation string, the signal generator component 110 can generate an intermediate output signal based on the low translation confidence score. For example, the signal generator component 110 can generate the intermediate output signal when the translation confidence score is below a predetermined threshold. The intermediate output signal can include a request for a rephrasing of an utterance in the first input audio signal. For example, the intermediate output signal can include a request for the user to repeat the utterance without the figure of speech.

The method 200 can include selecting a translation string (ACT 212). The translation engine 106 can select the translation string based on the translation scores of the translation strings. As described above, the input string can be processed through a first language model with an input language of A and an output language of B and a second language model with an input language of B and an output language of A. The language model having the input language that matches the language of the input string will generate a translation string with a higher translation score. Referring to FIG. 3, among others, the translation engine 106 can compare the translation scores of the translation string 306 and translation string 306(2). The translation engine 106 can determine that the translation string 306(2) has a higher translation score and can select the translation string 306(2) for inclusion in the output signal 308.

The method 200 can include generating an output signal (ACT 214). The signal generator component 110 can generate the output signal based on the translation string selected at ACT 212. The signal generator component 110 can generate the output signal by processing the translation string with a text-to-speech system to generate, for example, an audio file that includes a computer generated voice speaking the translation string.

The method 200 can include transmitting the output signal (ACT 216). The method 200 can include transmitting the output signal from the data processing system 102 to the client device 126. As illustrated in FIG. 3, the output signal 308 can be transmitted to the client device 126. The client device 126 can render the output signal as an output audio signal 310 that can be heard by the user 300(2). The utterances included in the output audio signal can be a translation of the utterances in the input audio signal. The output audio signal can include the utterances of the input audio signal translated from the language of the user 300(1) into the language of the user 300(2).

The utterances contained in the input audio signal can be a single turn in a conversation between the user 300(1) and the user 300(2). The client device 126 repeat the steps of the method 200 for additional input audio signals that are part of the conversation between the users 300. The users 300 can take turns providing utterances to the client device 126. A given user can provide multiple input audio signals to the client device 126. For example, the user 300(1) can provide multiple utterances to the client device 126 prior to the user 300(2) providing an utterance to the client device 126.

As the conversation between the users 300 progresses, the data processing system 102 can count the number of input audio signals received during the conversation or session. The signal generator component 110 can generate an intermediate output signal based on the count of the number of input audio signals. For example, when the input audio signal count is low (indicating that the session or conversation just started), the signal generator component 110 can generate intermediate output signals that can include instructions, prompts, or other information. For example, an intermediate output signal when the conversation first begins can include the output phrase "Should I explain to the other person how the translation service works?"

The length or the verboseness of the intermediate output signal can be based on the count of the input audio signals. For example, as the count of the input audio signals in the conversation increases, the length of the intermediate output signal can decrease. In one example, when the count of the input audio signals is low, the signal generator component 110 can generate intermediate outputs signals that include a phrase indicating the client device 126 is ready to receive the next utterance. For example, the intermediate output signal can include "Okay, I'm ready to translate." As the count of the input audio signals increases, the intermediate output signal can be shortened to just a chime indicating that the client device 126 is ready to receive utterances from the users.

The length or verboseness of the intermediate output signal can be based on a conversation count. For example, when the conversation count is low, indicating that the presently translated conversation is one of the first conversations translated by the data processing system 102 for a given user, the signal generator component 110 can generate longer intermediate output signals. For example, for one of the initial conversations translated (where the conversation count is low), the data processing system 102 can provide instructions responsive to activation, such as "Hi, I'm going to help translate your conversation. If I don't understand something you say, I'll ask you to repeat what you said. Otherwise, just speak normally, and I'll do my best to translate you." As the conversation count increases, the data processing system 102 can generate shorter intermediate output signals for the activation instructions. For example, after a predetermined number of conversations, the instructions provided after activation can be "Hi, I'm going to translate your conversation."

Figure 4:
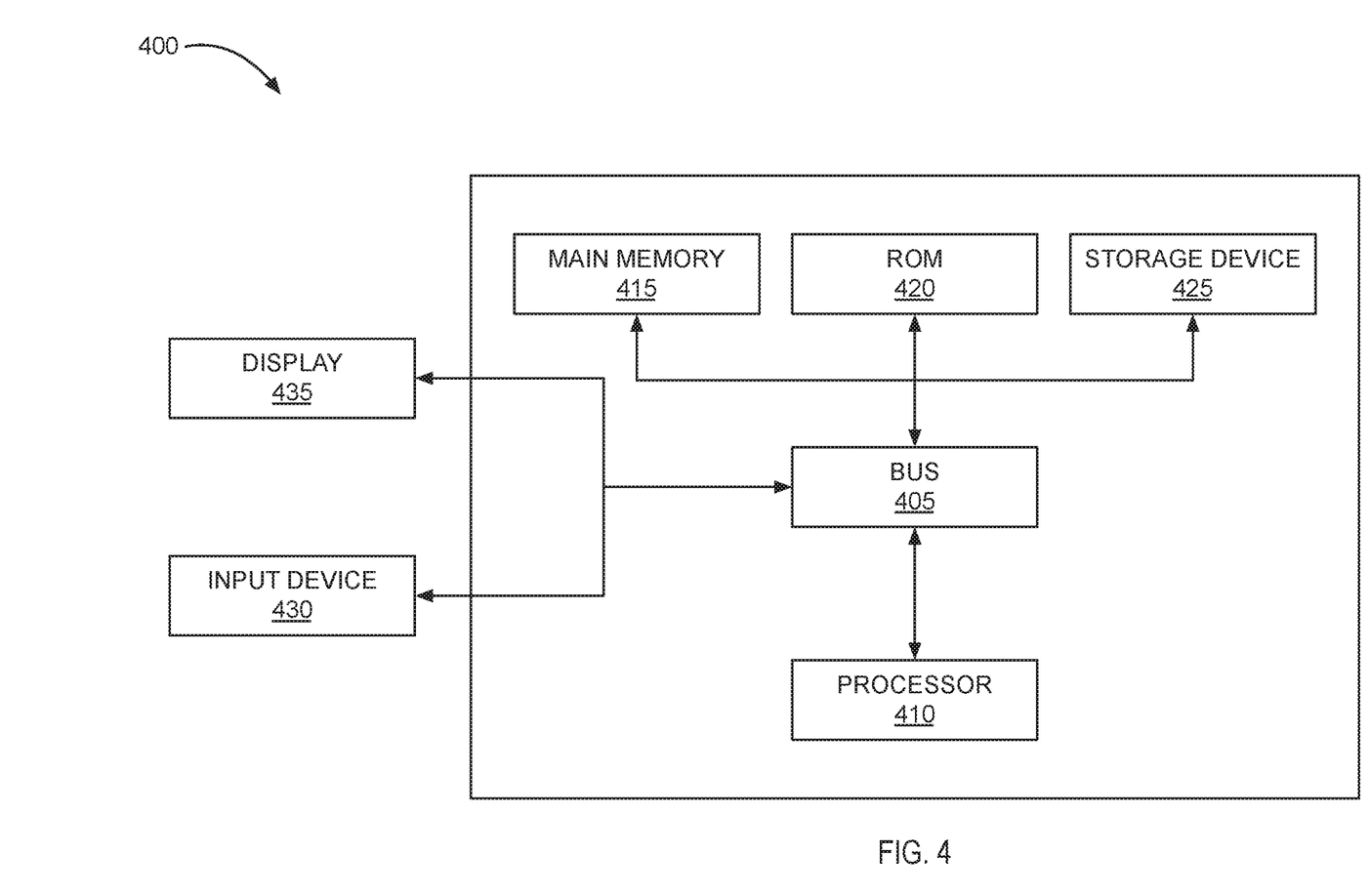
FIG. 4 is a block diagram of an example computer system.

FIG. 4 is a block diagram of an example computer system 400. The computer system or computing device 400 can include or be used to implement the system 100 or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information and instructions to be executed by the processor 410. The main memory 415 can be or include the data repository 132. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk, or optical disk, can be coupled to the bus 405 to persistently store information and instructions. The storage device 425 can include or be part of the data repository 132.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client device 126, or another component of FIG. 1, for example.

The processes, systems, and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter, including the operations described in this specification, can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features may collect personal information (e.g., information about a user's social network, social actions or activities, a user's preferences, or a user's location) or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages and declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

The subject matter described herein can be implemented in a computing system that includes a back end component, e.g., a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network, ("LAN") a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 124). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client device 126).

The system may include the interface to receive a second input audio signal detected by the sensor of the client device; the natural language processor component to determine a second confidence score of a second input string generated based on the second input audio signal; and the signal generator component to generate an intermediate output signal based on the second confidence second. The intermediate output signal may include a request for an updated input audio signal. The intermediate output signal may include a confirmation of the second input audio signal. The translation engine may: generate the first translation string with a first language model; and generate the second translation string with a second language model. The first translation score and the second translation score may indicate a likelihood that the first input audio signal can include an utterance in a first language. The signal generator component may: generate an intermediate output signal based on at least one of the first translation score and the second translation score being below a second predetermined threshold. The intermediate output signal may include a request for a rephrasing of an utterance in the first input audio signal. The system may include the natural language processor component to determine an output grammar set based on the input audio signal; the translation engine to determine the first translation score based on a comparison of the output grammar set with the first translation string; and the translation engine to determine the second translation score based on a comparison of the output grammar set with the second translation string. The data processing system may: generate a conversation count based on a number of interactions with the data processing system; and generate an intermediate output signal based on the conversation count. The system can include the data processing system to generate an input audio signal count based on a plurality of input audio signal receiving during a conversation session with the data processing system; and the signal generator component to generate an intermediate output signal based on the input audio signal count.

The method may include receiving, at the interface, a second input audio signal detected by the sensor of the client device; determining, by the natural language processor component, a second confidence score of a second input string generated based on the second input audio signal; and generating, by the signal generator component, an intermediate output signal based on the second confidence second. The intermediate output signal may include a request for an updated input audio signal. The method may include generating, by the translation engine, the first translation string with a first language model; and generating, by the translation engine, the second translation string with a second language model. The first translation score and the second translation score may indicate a likelihood that the first input audio signal can include an utterance in a first language. The method may include generating, by the signal generator component, an intermediate output signal based on at least one of the first translation score and the second translation score being below a second predetermined threshold, wherein the intermediate output signal can include a request for a rephrasing of an utterance in the first input audio. The method may include determining, by the natural language processor component, an output grammar set based on the input audio signal; determining, by the translation engine, the first translation score based on a comparison of the output grammar set with the first translation string; and determining, by the translation engine, the second translation score based on a comparison of the output grammar set with the second translation string. The method may include generating, by the data processing system, a conversation count based on a number of interactions with the data processing system; and generating, by the signal generator component, an intermediate output signal based on the conversation count. The method may include generating, by the data processing system, an input audio signal count based on a plurality of input audio signal receiving during a conversation session with the data processing system; and generating, by the signal generator component, an intermediate output signal based on the input audio signal count.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 108 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or embodiments.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods or their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A' or only 'B' as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to generate a voice-based interface, comprising:
    a data processing system comprising a memory and one or more processors that execute a natural language processor component, a translation engine, and a signal generator component to:
    receive, at an interface of the data processing system, a first input audio signal detected by a sensor of a client device;
    generate, by the natural language processor component, a first input string based on the first input audio signal;

determine, by the natural language processor component, a first confidence score indicating an accuracy of the first input string;
generate, by the translation engine, a first translation string in a second language and a second translation string in a first language, from the first input string and based on the first confidence score being above a predetermined threshold, wherein the first translation string in the second language is generated using a first translation model having the first language as an input language and the second language as an output language, the second translation string in the first language is generated using a second translation model having the second language as the input language and the first language as the output language, and the second language is different from the first language;
determine, by the translation engine, a first translation score for the first translation string that indicates an accuracy of the first translation string and a second translation score for the second translation string that indicates an accuracy of the second translation string;
select, by the translation engine, the first translation string based on the first translation score and the second translation score;
generate, by the signal generator component, an output audio signal from the first translation string; and
transmit, by the interface, the output audio signal to the client device to render the output audio signal.

2. The system of claim 1, comprising:
the interface to receive a second input audio signal detected by the sensor of the client device;
the natural language processor component to determine a second confidence score of a second input string generated based on the second input audio signal; and
the signal generator component to generate an intermediate output signal based on the second confidence score.

3. The system of claim 2, wherein the intermediate output signal comprises a request for an updated input audio signal.

4. The system of claim 2, wherein the intermediate output signal comprises a confirmation of the second input audio signal.

5. The system of claim 1, wherein the first translation score and the second translation score indicate a likelihood that the first input audio signal comprises an utterance in a first language.

6. The system of claim 1, comprising the signal generator component to:
generate an intermediate output signal based on at least one of the first translation score and the second translation score being below a second predetermined threshold.

7. The system of claim 6, wherein the intermediate output signal comprises a request for a rephrasing of an utterance in the first input audio signal.

8. The system of claim 1, comprising:
the natural language processor component to determine an output grammar set based on the first input audio signal;
the translation engine to determine the first translation score based on a comparison of the output grammar set with the first translation string; and
the translation engine to determine the second translation score based on a comparison of the output grammar set with the second translation string.

9. The system of claim 1, comprising the data processing system to:
generate a conversation count based on a number of interactions with the data processing system; and
generate an intermediate output signal based on the conversation count.

10. The system of claim 1, comprising:
the data processing system to generate an input audio signal count based on a plurality of input audio signals received during a conversation session with the data processing system; and
the signal generator component to generate an intermediate output signal based on the input audio signal count.

11. A method to generate a voice-based interface, comprising:
receiving, at an interface of a data processing system, a first input audio signal detected by a sensor of a client device;
generating, by a natural language processor component, a first input string based on the first input audio signal;
determining, by the natural language processor component, a first confidence score indicating an accuracy of the first input string;
generating, by a translation engine, a first translation string in a second language and a second translation string in a first language, from the first input string and based on the first confidence score being above a predetermined threshold, wherein the first translation string in the second language is generated using a first translation model having the first language as an input language and the second language as an output language, the second translation string in the first language is generated using a second translation model having the second language as the input language and the first language as the output language, and the second language is different from the first language;
determining, by the translation engine, a first translation score for the first translation string indicating an accuracy of the first translation string and a second translation score for the second translation string indicating an accuracy of the second translation string;
selecting, by the translation engine, the first translation string based on the first translation score and the second translation score;
generating, by a signal generator component, an output audio signal from the first translation string; and
transmitting, by the interface, the output audio signal to the client device to render the output audio signal.

12. The method of claim 11, comprising:
receiving, at the interface, a second input audio signal detected by the sensor of the client device;
determining, by the natural language processor component, a second confidence score of a second input string generated based on the second input audio signal; and
generating, by the signal generator component, an intermediate output signal based on the second confidence score.

13. The method of claim 12, wherein the intermediate output signal comprises a request for an updated input audio signal.

14. The method of claim 11, wherein the first translation score and the second translation score indicate a likelihood that the first input audio signal comprises an utterance in a first language.

15. The method of claim 11, comprising:
generating, by the signal generator component, an intermediate output signal based on at least one of the first translation score and the second translation score being below a second predetermined threshold, wherein the intermediate output signal comprises a request for a rephrasing of an utterance in the first input audio signal.

16. The method of claim 11, comprising:

determining, by the natural language processor component, an output grammar set based on the first input audio signal;

determining, by the translation engine, the first translation score based on a comparison of the output grammar set with the first translation string; and determining, by the translation engine, the second translation score based on a comparison of the output grammar set with the second translation string.

17. The method of claim 11, comprising:

generating, by the data processing system, a conversation count based on a number of interactions with the data processing system; and generating, by the signal generator component, an intermediate output signal based on the conversation count.

18. The method of claim 11, comprising:

generating, by the data processing system, an input audio signal count based on a plurality of input audio signals received during a conversation session with the data processing system; and generating, by the signal generator component, an intermediate output signal based on the input audio signal count.

19. The system of claim 1, wherein in generating the first translation string and the second translation string from the first input string, the translation engine passes the first input string to the first translation model and to the second translation model in parallel.

\* \* \* \* \*